Oct. 25, 1966           F. N. TULLOS           3,280,938
DYNAMIC DETECTION OF UNBALANCED LOADING
OF VIBRATING COUPLING PLATES
Filed March 31, 1964
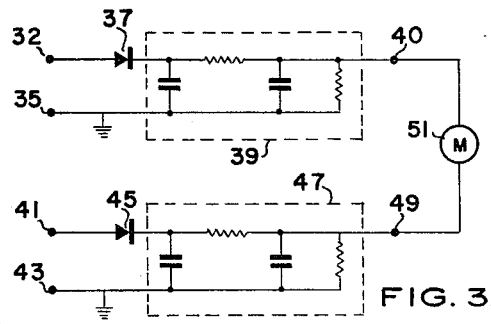
FIG. 3.
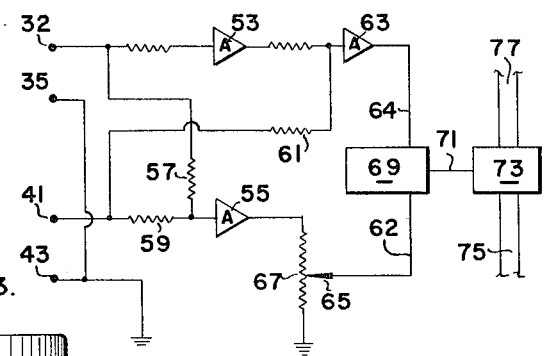
FIG. 4.
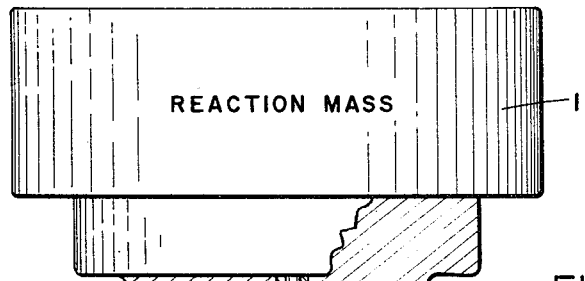
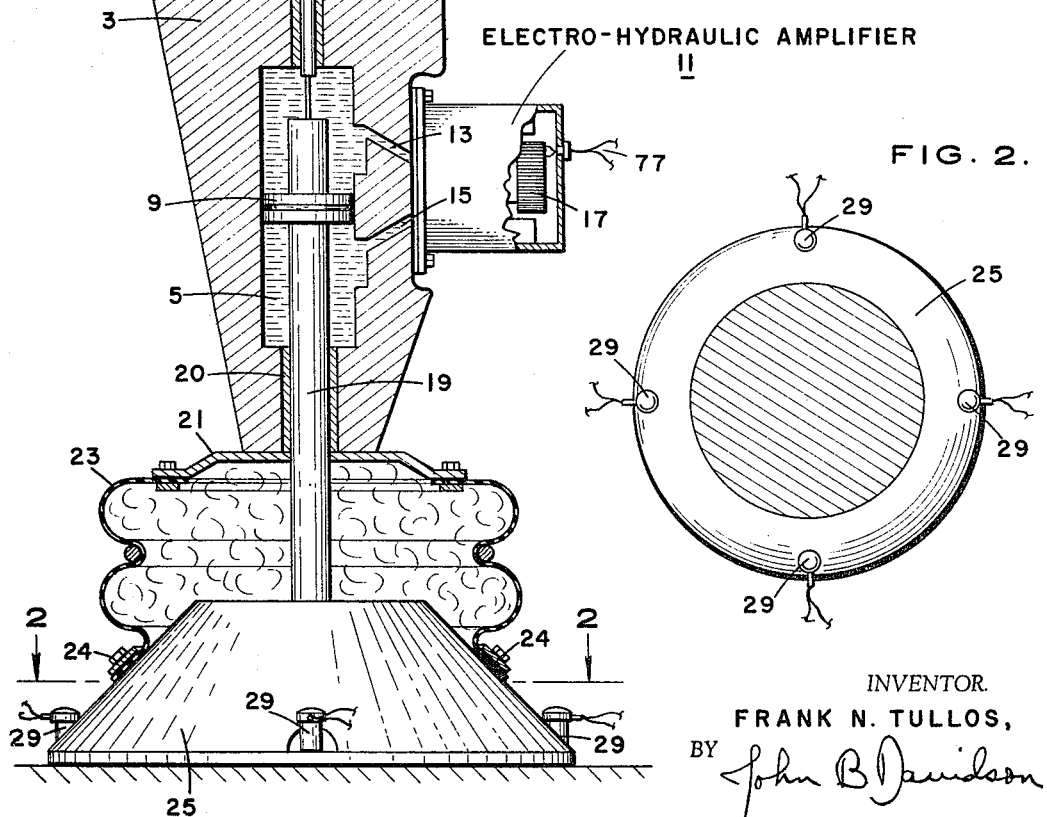
FIG. 1.
FIG. 2.
INVENTOR.
FRANK N. TULLOS,
BY John B Davidson
ATTORNEY.

United States Patent Office 3,280,938
Patented Oct. 25, 1966

1

3,280,938
DYNAMIC DETECTION OF UNBALANCED LOADING OF VIBRATING COUPLING PLATES
Frank N. Tullos, Houston, Tex., assignor, by mesne assignments, to Esso Production Research Company, Houston, Tex., a corporation of Delaware
Filed Mar. 31, 1964, Ser. No. 356,267
5 Claims. (Cl. 181—.5)

This invention relates to the detection of unbalances in the coupling between a vibratory coupling plate and a medium to be vibrated thereby, and more particularly to apparatus for use in continuous wave seismic prospecting for detecting unbalanced coupling between the earth and the coupling plate of an earth vibrator.

Mechanical vibrators have been extensively used for many years in the testing of large structural members, such as aircraft wings, that are subject to large amplitude vibratory stresses. Such devices usually use an electrohydraulic amplifier to control the movement of a piston driving a piston rod connected to a large plate for coupling the vibrational movement of the piston to the structural member.

In recent years, vibratory devices of the type described above have been used as a source of seismic waves in connection with the continuous wave seismic prospecting technique. For many reasons it is highly desirable to have an equal load between the plate and the medium to be vibrated whether such medium is the earth or a structural member. However, such equal loading is not always obtainable. For example, inhomogeneity and lumps in the earth's surface unbalance the loading and tend to force the piston rod hard against sleeve bearings ordinarily used therewith. If the static force across the plates becomes highly unbalanced, the rod will be forced against the sleeve bearing in a manner that will prevent lubrication, and the dynamic forces of vibration will destroy the bearings. It is practically impossible to measure the static loading of the bearing. It has been found, however, that the velocity of different points on the plate will vary with the loading, and such velocity may be detected at the various points to provide an indication of the degree of unbalance in the coupling between the vibratory plate and the medium to be vibrated. In accordance with the present invention, the velocity of movement of the plate is detected at a plurality of spaced-apart locations thereon, and a signal is produced that is indicative of the detected velocity of movement at each point. The signals are cross-correlated so as to detect differences in velocities between pairs of spaced-apart locations. When the velocity differences are sufficiently great, the vibrator should be stopped.

In accordance with another aspect of the invention, a plurality of velocity sensitive means, adapted to produce electrical signals having a characteristic variable in magnitude in accordance with the velocity of movement of the coupling plate in a given plane, are connected to the coupling plate. Means are connected to selected pairs of the velocity sensitive means for producing an output signal indicative of the differences in the magnitude of the measured characteristic of the selected pairs of velocity sensitive means. For specifically, the last-named means may comprise a plurality of rectifier and filter means individually connected to the pickups for producing a D.C. output signal that is variable in accordance with the amplitude of the A.C. signal produced by the pickup connected thereto, and means connected to a pair of the rectifier and filter means for producing an output signal indicative of the difference in the amplitudes of the output signals of said pair of rectifier and filter means. Alternatively, there may be provided means connected

2 to a pair of the velocity sensitive means for producing a first output signal having an amplitude indicative of the difference of the amplitudes of the output signals of a selected pair of velocity sensitive means and for providing a second output signal having an amplitude indicative of the sum of the amplitudes of such output signals. Additionally, means may be provided for producing a final output signal indicative of the ratio of the difference signal to the sum signal. This final output signal may be used to actuate a relay or other switching means for deactivating the vibrator.

Objects and features of the invention not apparent from the above discussion will become evident upon consideration of the following detailed description of the invention when taken in connection with the accompanying drawings, wherein:

FIG. 1 is a cross-sectional view of a vibrator such as may be used in accordance with the invention;

FIG. 2 is a reduced cross-sectional view taken across line 2—2 of FIG. 1;

FIG. 3 is an electrical schematic diagram of apparatus for detecting differences in the output signals of the velocity sensitive pickup illustrated in FIGS. 1 and 2, in accordance with one aspect of the invention; and FIG. 4 is an electrical schematic diagram of another apparatus for detecting differences in the amplitudes of the signals of velocity sensitive pickups.

With reference now to FIG. 1, there is shown an earth vibrator of a type that has been found to be very effective in connection with the continuous wave seismic prospecting technique. This vibrator comprises a very heavy reaction mass 1, supported on a piston cylinder housing 3. The piston cylinder housing in turn is supported on an air spring comprising an annular plate 21, a flexible housing member 23, and a connecting means 24 for connecting the flexible member 23 to a coupling plate 25. The apparatus for controlling the vibrations of the coupling plate 25 comprises a piston 9 in piston cylinder 5 within the housing 3. The vertical vibratory movement of the piston 9 is controlled by an electrohydraulic amplifier 11 coupled to each side of the piston 9 through ports 13 and 15 in housing 3. In accordance with usual practice, a suitable source of pressurized fluid (not shown) is connected to the electrohydraulic amplifier and the piston cylinder 5. Electrical signals for the control winding 17 of the electrohydraulic amplifier 11 are coupled to the winding 17 through terminals 77.

The piston 9 is connected to the coupling plate 25 through a piston rod 19 which extends through a bearing 20 therefor, and through the air spring flange 21 to the upper end of the coupling plate 25. Electrical signals connected to terminals 77 are amplified by amplifier 11 so as to control the reciprocatory vertical movement of piston 9, piston rod 19, and coupling plate 25. This is all in accordance with usual practice and will not be further discussed herein.

Connected to the coupling plate 25 at a plurality of spaced-apart locations thereon are a plurality of velocity sensitive means 29 for measuring the movement of the plate 25 in a given plane (normally the vertical plane). The locations may be evenly spaced around the periphery of the coupling plate (as illustrated in FIG. 2), although, if convenient, the spacing need not necessarily be equal. Normally, it will be desirable to measure the vertical movement of the plate at mutually opposed locations thereon as shown in FIG. 2. Preferably, the means for measuring such vertical movement are velocity sensitive geophones; however, accelerometers may be used for this purpose along with electrical circuits for integrating the output signals thereof. As illustrated, each of the pickups is provided with a pair of output leads for conducting the output signals to apparatus to be described. If convenient, one of the leads may be grounded.

Connected to selected pairs of geophones are means for measuring differences in a characteristic, preferably the amplitude, of the output signals produced thereby. With reference now to FIG. 3, there is shown a very effective apparatus for this purpose. This apparatus comprises two pairs of terminals 32, 35 and 41, 43 for connection to the output leads of a selected pair of velocity sensitive pickups. The selected pair of velocity sensitive pickups preferably are oppositely positioned on the coupling plate, although, as indicated above, this is not absolutely necessary. Half wave rectifiers 37, 45 are connected to terminals 32 and 41. The rectified output signals from rectifier 37 are filtered by a simple resistance-capacitance type filter 39 and applied to terminal 40. Similarly, the output signals from rectifier 45 are filtered by a similar filter 47 for application to terminal 49. The terminals 35 and 43 may be grounded, if convenient, so that the signals at terminals 40 and 49 are with respect to ground. Connected between terminals 40 and 49 is milliammeter 51 adapted to provide an output signal indicative of the difference in the voltages produced at the terminals 40 and 49. As can be seen, when the output signals from the velocity sensitive means connected to the pairs of terminals 32, 35 and 41, 43 are different in amplitude, current will flow through the milliammeter 51, which current will vary in amplitude in accordance with the difference in the amplitudes of the signals connected to the input terminals. When the output signal produced by milliammeter 51 reaches a sufficient amplitude, the operator should stop the vibrator to prevent damage thereto.

The apparatus illustrated in FIG. 4 not only includes means for detecting the difference in the amplitudes of the output signals of a selected pair of velocity sensitive means, but also means for automatically stopping the action of the vibrator when an imbalance of predetermined magnitude is detected. The signals connected to the control winding terminals 77 of the electrohydraulic amplifier 11 are applied through a relay 73 having input terminals 75 to which the control signals are applied. The relay 73 is actuated by the output signal of a signal comparing circuit 69, which may be a circuit such as is illustrated at page 467 of the text Pulse & Digital Circuits by Millman and Taub (McGraw-Hill 1956). The signal comparing circuit 69 is provided with two input terminals which are connected to lines 62 and 64, and is adapted to produce an output signal indicative of the ratio of the amplitude of the signal on line 64 relative to the amplitude of the signal on line 62. Line 64 is coupled to input terminals 32, 35 through an inverting amplifier 53 and a conventional amplifier 63, and to terminals 41, 43 through adding resistor 61 and amplifier 63 such that the signal appearing on line 64 is indicative of the difference in the amplitudes of the signals applied to input terminals 32, 35 and 41, 43. The inverting amplifier 53 inverts the signal applied to terminals 32, 35, and this inverted signal is added to the signal appearing at terminals 41, 43 so that the output signal from amplifier 63 is indicative of the difference in the amplitudes of the signals. The signal appearing on line 62 is derived from amplifier 55 through a voltage dividing potentiometer 67 having a variable tap 65. The input terminals 32, 35 and 41, 43 are connected to the input of amplifier 55 through an adding circuit comprising resistors 57 and 59 so that the input signals are added in the output of amplifier 55. By adjusting the tap 65 of potentiometer 67, the amplitude of the output signal appearing on line 71 produced by a given difference in the amplitudes of the signals applied to input terminals 32, 35 and 41, 43 may be varied. Since a signal of at least a given amplitude is required to actuate relay 73, a potentiometer 67 determines the required difference in magnitude of the output signals of the velocity sensitive pickups connected to the circuit that is required to actuate relay 73.

In practice, at least two pairs of velocity sensitive pickups should be positioned on the coupling plate 25. Preferably, four or six pickups should be so positioned. When four pickups are used as shown in FIG. 2, two circuits of the type illustrated in FIGS. 3 and 4 will be required. If the circuit illustrated in FIG. 4 is used, the output signals of the circuits corresponding to comparator circuits 69 may be applied to the relay 73 through diodes so that any output signal therefrom can actuate relay 73. Alternatively, a relay having a plurality of actuating windings may be used so that the various comparator circuits may be connected to individual windings.

The invention is not necessarily to be restricted to the specific structural details, arrangement of parts, or circuit connections herein set forth, as various modifications thereof may be effected without departing from the spirit and scope of the invention.

What is claimed is:

1. Apparatus for detecting an unbalance in the coupling between a vibratory plate adapted to be shaken by a vibrator, and a medium to be shaken by the vibrator and plate, comprising:
   a plurality of velocity sensitive means connected to said plate at a plurality of spaced-apart locations thereon, adapted to produce electrical signals proportional to the velocity of movement of said plate in a given plane;
   first means connected to a selected pair of said velocity sensitive means for producing an output signal having amplitude indicative of the difference of the amplitudes of the output signals of said selected pair of velocity sensitive means;
   second means connected to said selected pair of velocity sensitive means for producing an output signal having amplitude indicative of the sum of the amplitudes of the output signals of said selected pair of velocity sensitive means;
   third means connected to said first means and said second means for producing an output signal indicative of the ratio of the amplitude of the output signal of said first means to the amplitude of the output signal of said second means; and
   means connected to said third means for deactivating the vibrator responsive to production of an output signal by said third means indicating that the output signal of said first means is at least a predetermined percentage of the output signal of said second means.

2. Apparatus for detecting an unbalance in the coupling between a vibratory plate adapted to be shaken by a vibrator, and a medium to be shaken by the vibrator and plate, comprising:
   a plurality of velocity sensitive means connected to said plate at a plurality of spaced-apart locations thereon, adapted to produce electrical signals variable in amplitude in accordance with velocity of movement of said plate in a given plane;
   first means connected to a selected pair of said velocity sensitive means for producing an output signal having amplitude indicative of the difference of the amplitude of the output signals of said selected pair of velocity sensitive means;
   second means connected to said selected pair of velocity sensitive means for producing an output signal having amplitude indicative of the sum of the amplitudes of the output signals of said selected pair of velocity sensitive means; and
   third means connected to said first and second means for deactivating the vibrator when the amplitude of the output signal of said first means is at least a predetermined percentage of the amplitude of the output signal of said second means.

3. Apparatus for injecting a seismic signal into the earth, comprising:

electrically controlled vibratory means having electrically responsive control means, for producing a vibratory signal responsive to an electrical control signal coupled to said control means;

terminal means for receiving an electrical control signal;

means including electrical switching means for selectively connecting and disconnecting said terminal means and said control means;

a coupling plate connected to said vibratory means for coupling the vibrations produced thereby to the earth;

a plurality of detecting means connected to various locations on said coupling plate for producing electrical signals indicative of the velocity of movement of said coupling plate at said various locations thereon; and circuit means connected to said detecting means and responsive to the output signals thereof to detect differences in the velocities detected by selected pairs of said detecting means and to produce an output indication responsive thereto.

4. Apparatus for injecting a seismic signal into the earth, comprising:

electrically controlled vibratory means having electrically responsive control means, for producing a vibratory signal responsive to an electrical control signal coupled to said control means;

terminal means for receiving an electrical control signal;

means including electrical switching means for selectively connecting and disconnecting said terminal means and said control means;

a coupling plate connected to said vibratory means for coupling the vibrations produced thereby to the earth;

a plurality of detecting means connected to various locations on said coupling plate for producing electrical signals indicative of the velocity of movement of said coupling plate at said various locations thereon;

circuit means connected to said detecting means and responsive to the output signals thereof to detect differences in the velocities detected by selected pairs of said detecting means and to produce an output indication responsive thereto; and means connected to said circuit means and to said electrical switching means for actuating said electrical control means to disconnect said terminal means from said electrically responsive control means responsive to detection by said circuit means of a predetermined difference in the velocities detected by selected pairs of said detecting means.

5. Apparatus for injecting a seismic signal into the earth, comprising:

electrically controlled vibratory means having electrically responsive control means, for producing a vibratory signal responsive to an electrical signal coupled to said control means;

terminal means for receiving a vibratory signal;

means including electrical switching means for selectively connecting and disconnecting said terminal means and said control means;

a coupling plate connected to said vibratory means for coupling the vibrations produced thereby to the earth;

a plurality of detecting means connected to various locations on said coupling plate for producing electrical signals having amplitude indicative of the velocity of movement of said coupling plate at said various locations thereon;

first circuit means connected to a selected pair of said detecting means for producing a first electrical signal having amplitude indicative of the difference of the amplitudes of said selected pair of said detecting means;

second circuit means connected to said selected pair of said detecting means for producing a second output signal having amplitude indicative of the sum of the amplitudes of said selected pair of said detecting means; and third circuit means connected to said first and second circuit means and to said electrical switching means, adapted to actuate said switching means to disconnect said terminal means from said vibratory means when the output signal from said first circuit means is of a predetermined magnitude relative to the magnitude of the output signal from said second circuit means.

References Cited by the Examiner

UNITED STATES PATENTS

| | | | |
|---|---|---|---|
| 2,365,218 | 12/1944 | Rogers | 181—.5 |
| 2,520,297 | 8/1950 | Anderson | 181—.5 |
| 3,095,532 | 6/1963 | Floyd. | |
| 3,100,292 | 8/1963 | Warner et al. | 181—.5 |

BENJAMIN A. BORCHELT, *Primary Examiner.*

SAMUEL FEINBERG, *Examiner.*

W. KUJAWA, *Assistant Examiner.*